United States Patent
Ukil et al.

(10) Patent No.: US 10,268,836 B2
(45) Date of Patent: Apr. 23, 2019

(54) SYSTEM AND METHOD FOR DETECTING SENSITIVITY CONTENT IN TIME-SERIES DATA

(71) Applicant: Tata Consultancy Services Limited, Mumbai, Maharashtra (IN)

(72) Inventors: Arijit Ukil, West Bengal (IN); Soma Bandyopadhyay, West Bengal (IN); Arpan Pal, West Bengal (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 0 days.

(21) Appl. No.: 14/618,280

(22) Filed: Feb. 10, 2015

(65) Prior Publication Data

US 2015/0261963 A1 Sep. 17, 2015

(30) Foreign Application Priority Data

Mar. 14, 2014 (IN) .......................... 871/MUM/2014

(51) Int. Cl.
*G06F 21/62* (2013.01)
*H04L 29/06* (2006.01)
*G01D 4/00* (2006.01)

(52) U.S. Cl.
CPC .......... *G06F 21/6245* (2013.01); *H04L 63/04* (2013.01); *G01D 4/002* (2013.01); *H04L 2209/04* (2013.01); *H04L 2209/42* (2013.01); *Y02B 90/241* (2013.01); *Y04S 20/32* (2013.01); *Y04S 40/24* (2013.01)

(58) Field of Classification Search
None
See application file for complete search history.

(56) References Cited

U.S. PATENT DOCUMENTS

| | | | |
|---|---|---|---|
| 6,233,578 B1 * | 5/2001 | Machihara | G06F 17/30424 |
| 7,706,852 B2 | 4/2010 | Baker | |
| 8,471,712 B2 | 6/2013 | Egan et al. | |

(Continued)

OTHER PUBLICATIONS

Ukil, "An Efficient Distribution Sensitive Privacy for Real-Time Applications", Dec. 2011, Springer Science+Business Media, pp. 81-90.*

(Continued)

*Primary Examiner* — Benjamin E Lanier
(74) *Attorney, Agent, or Firm* — HM Law Group LLP; Vani Moodley, Esq.

(57) ABSTRACT

A system and method for detecting sensitivity content in time-series data is disclosed. The method comprises receiving the time-series data from a source. The data is received for one or more instances. The method further comprises detecting the sensitivity content in the time-series data. The sensitivity content indicates presence of an anomaly. The detecting comprises determining a kurtosis value corresponding to the time-series data. The detecting further comprises comparing the kurtosis value with a reference value. The detecting further comprises processing the data using a first filtering means or a second filtering means. The first filtering means is used when the data distribution of the time-series data is either of a platykurtic distribution or a mesokurtic distribution. The second filtering means is used when the data distribution of the time-series data is a leptokurtic distribution.

9 Claims, 7 Drawing Sheets

(56) References Cited

U.S. PATENT DOCUMENTS

| | | | |
|---|---|---|---|
| 10,079,839 B1* | 9/2018 | Bryan | H04L 63/1408 |
| 2003/0182035 A1* | 9/2003 | DiLodovico | G08G 1/164 |
| | | | 701/32.2 |
| 2012/0190947 A1 | 6/2012 | Chon et al. | |
| 2014/0237620 A1* | 8/2014 | Ukil | G06F 21/60 |
| | | | 726/26 |

OTHER PUBLICATIONS

EPA, "Data Quality Assessment: Statistical Methods for Practitioners", Feb. 2006, United States Environmenal Protection Agency, pp. 1-198.*

Neilsen, "Study and Characterization of Exoplanets", Aug. 2012, pp. 1-80.*

Wong et al., "(α,k)Anonymity :An Enhanced k-Anonymity Model for Privacy Preserving Data Publishing" Aug. 20-23, 2006, Philadelphia, Pennsylvania, USA, 6 pages.

Dakos et al., "Methods for Detecting Early Warnings of Critical Transitions in Time Series Illustrated Using Simulated Ecological Data"; PLoS ONE 7(7):1-20, Jul. 17, 2012.

Hilas, et al., "Change Point Detection in Time Series Using Higher-Order Statistics: A Heuristic Approach" Hindawi Publishing Corporation. vol. 2013. Nov. 10, 2012, 10 pages.

Parthasarathi et al. "Investigating Privacy-Sensitive Features for Speech Detection in Multiparty Conversations" Retrieved date : Feb. 7, 2015. 4 pages.

* cited by examiner

SYSTEM AND METHOD FOR DETECTING SENSITIVITY CONTENT IN TIME-SERIES DATA

REFERENCE TO RELATED APPLICATIONS

The present application does claim priority from an Indian application no. 871/MUM/2014 filed on 14 Mar. 2014.

TECHNICAL FIELD

The present disclosure relates to a field of sensitivity content detection. More particularly, the present disclosure relates to a system and method for detecting sensitivity content in time-series data.

BACKGROUND

With increase in adaptation of technology, large amount of data is generated, processed, stored, distributed, and analyzed across various platforms. The data may be generated from several sources comprising private information. The data may be generated from the sources such as data processing devices comprising servers, applications, sensors and networks. The data generated may be used to identify and to analyze a pattern of the data over a period of time. The user may not be aware of the amount of private data accessed by third party sources or applications.

Sharing the data collected from multiple sources to untrusted third party sources might lead to misuse of the private data. Further, sharing the private data with untrusted third party sources may lead to activation of unwanted services or applications and may lead to a breach of privacy. Further, the user may have to be notified about the risk of sharing the private data before sharing the private data to third party sources and applications.

Traditionally, several statistical techniques have been utilized to detect the occurrence of privacy breaches in the data. The statistical techniques used are supervised learning based sensitivity detection that requires customized hardware for generating the data. Further, the supervised learning based sensitivity detection techniques are expensive. Other statistical techniques involve use of rudimentary statistics, generate high false negative alarms, and are prone to errors.

SUMMARY

This summary is provided to introduce concepts related to systems and methods for detecting sensitivity content in data and the concepts are further described below in the detailed description. This summary is not intended to identify essential features of the claimed subject matter nor is it intended for use in determining or limiting the scope of the claimed subject matter.

In one implementation, a method for detecting sensitivity content in time-series data is disclosed. The method comprises receiving, by a processor, the time-series data from a source. The time-series data is received for one or more instances. An instance of the one or more instances is associated with a value of the time-series data. The method further comprises detecting, by the processor, the sensitivity content in the time-series data. The sensitivity content indicates presence of an anomaly. The detecting further comprises determining a kurtosis value corresponding to the time-series data. The detecting further comprises comparing the kurtosis value with a reference value. The detecting further comprises determining a data distribution of the time-series data based upon the comparison. The data distribution comprises one of a platykurtic distribution, a mesokurtic distribution, and a leptokurtic distribution. The detecting further comprises processing the time-series data using a first filtering means or a second filtering means. The first filtering means is used when the data distribution of the time-series data is either of the platykurtic distribution or the mesokurtic distribution. The second filtering means is used when the data distribution of the time-series data is the leptokurtic distribution.

In one implementation, a system for detecting sensitivity content in time-series data is disclosed. The system comprises a processor and a memory coupled to the processor. The processor executes a plurality of modules stored in the memory. The plurality of modules comprises a reception module to receive the time-series data from a source. The time-series data is received for one or more instances. An instance of the one or more instances is associated with a value of the time-series data. The plurality of modules further comprises a detection module to detect the sensitivity content in the time-series data. The sensitivity content indicates presence of an anomaly. The detection module further determines a kurtosis value corresponding to the time-series data. The detection module further compares the kurtosis value with a reference value. The detection module further determines a data distribution of the time-series data based upon the comparison. The data distribution comprises one of a platykurtic distribution, a mesokurtic distribution, and a leptokurtic distribution. The detection module further processes the time-series data using a first filtering means or a second filtering means. The first filtering means is used when data distribution of the time-series data is either of the platykurtic distribution or the mesokurtic distribution. The second filtering means is used when the data distribution of the time-series data is the leptokurtic distribution.

In one implementation, a non-transitory computer readable medium embodying a program executable in a computing device for detecting sensitivity content in time-series data is disclosed. The program comprises a program code for receiving the time-series data from a source. The time-series data is received for one or more instances. An instance of the one or more instances is associated with a value of the time-series data. The program further comprises a program code for detecting the sensitivity content in the time-series data. The sensitivity content indicates presence of an anomaly. The program code for detecting the sensitivity content further comprises a program code for determining a kurtosis value corresponding to the time-series data. The program code for detecting the sensitivity content further comprises a program code for comparing the kurtosis value with a reference value. The program code for detecting the sensitivity content further comprises a program code for determining a data distribution of the time-series data based upon the comparison. The data distribution comprises one of a platykurtic distribution, a mesokurtic distribution, and a leptokurtic distribution. The program code for detecting the sensitivity content further comprises a program code for processing the time-series data using a first filtering means or a second filtering means. The first filtering means is used when the data distribution of the time-series data is either of the platykurtic distribution or the mesokurtic distribution. The second filtering means is used when the data distribution of the time-series data is the leptokurtic distribution.

BRIEF DESCRIPTION OF THE DRAWINGS

The detailed description is described with reference to the accompanying figures. In the figures, the left-most digit(s) of FIG. 1 illustrates a network implementation of a system for detecting sensitivity content in time-series data, in accordance with an embodiment of the present disclosure.

DETAILED DESCRIPTION

The present disclosure relates to system(s) and method(s) for detecting sensitivity content in time-series data. The time-series data is received from a source for one or more instances. An instance of the one or more instances is associated with a value of the time-series data. The sensitivity content is detected in the time-series data. The sensitivity content indicates presence of an anomaly in the time-series data. A kurtosis value corresponding to the time-series data is determined. The kurtosis value is compared with a reference value. A data distribution of the time-series data is determined based upon the comparison. The data distribution comprises one of a platykurtic distribution, a mesokurtic distribution, and a leptokurtic distribution. The time-series data is processed using a first filtering means or a second filtering means.

The first filtering means is used when data distribution of the time-series data is either of the platykurtic distribution or the mesokurtic distribution. The second filtering means is used when the data distribution of the time-series data is the leptokurtic distribution.

A density of the sensitivity content detected is identified to alert a user indicating detection of the sensitivity content in the time-series data. The method for detecting sensitivity content in the time-series data minimizes false positive and false negative alarm rates by using a Hampel filter as the first filtering means and a median-based Rosner filter as the second filtering means.

While aspects of described system and method for detecting sensitivity content in time-series data may be implemented in any number of different computing systems, environments, and/or configurations, the embodiments are described in the context of the following exemplary system.

Figure 1:
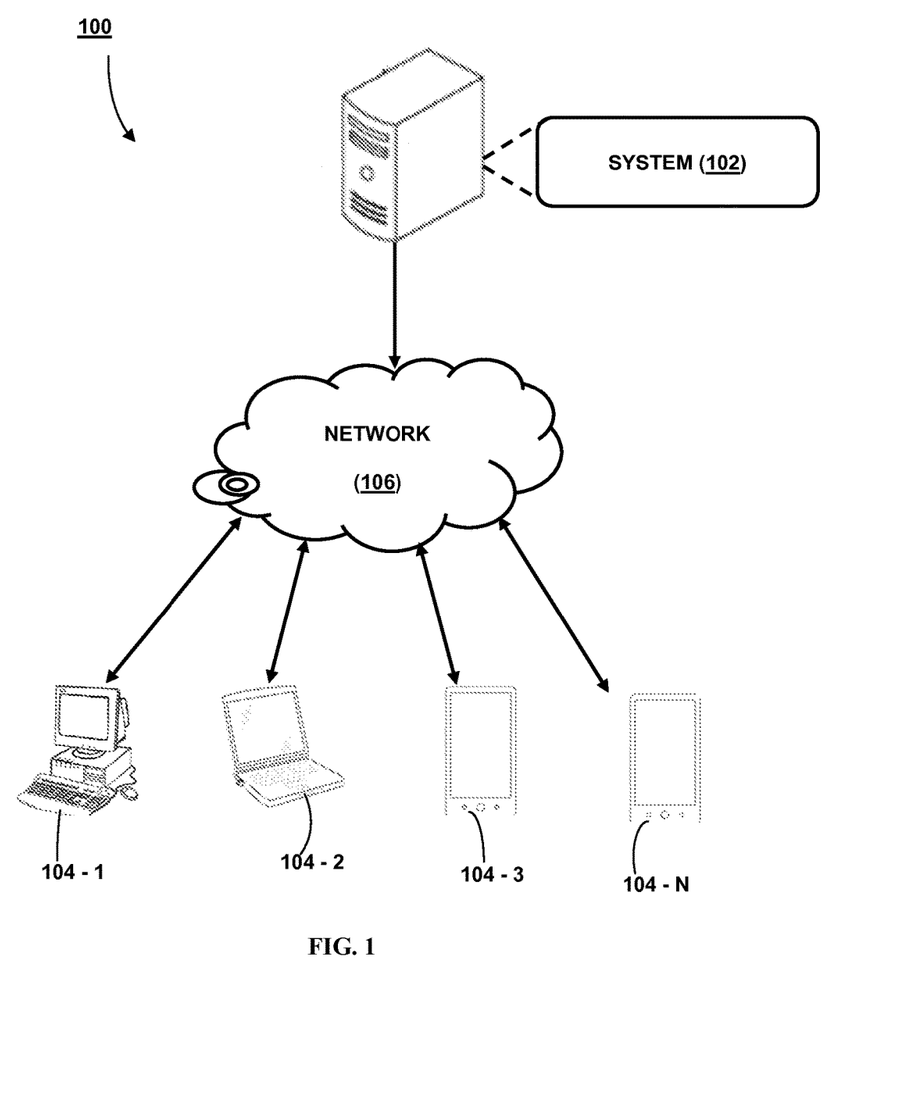

Referring now to FIG. 1, a network implementation 100 of a system 102 for detecting sensitivity content in time-series data is illustrated, in accordance with an embodiment of the present disclosure.

Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
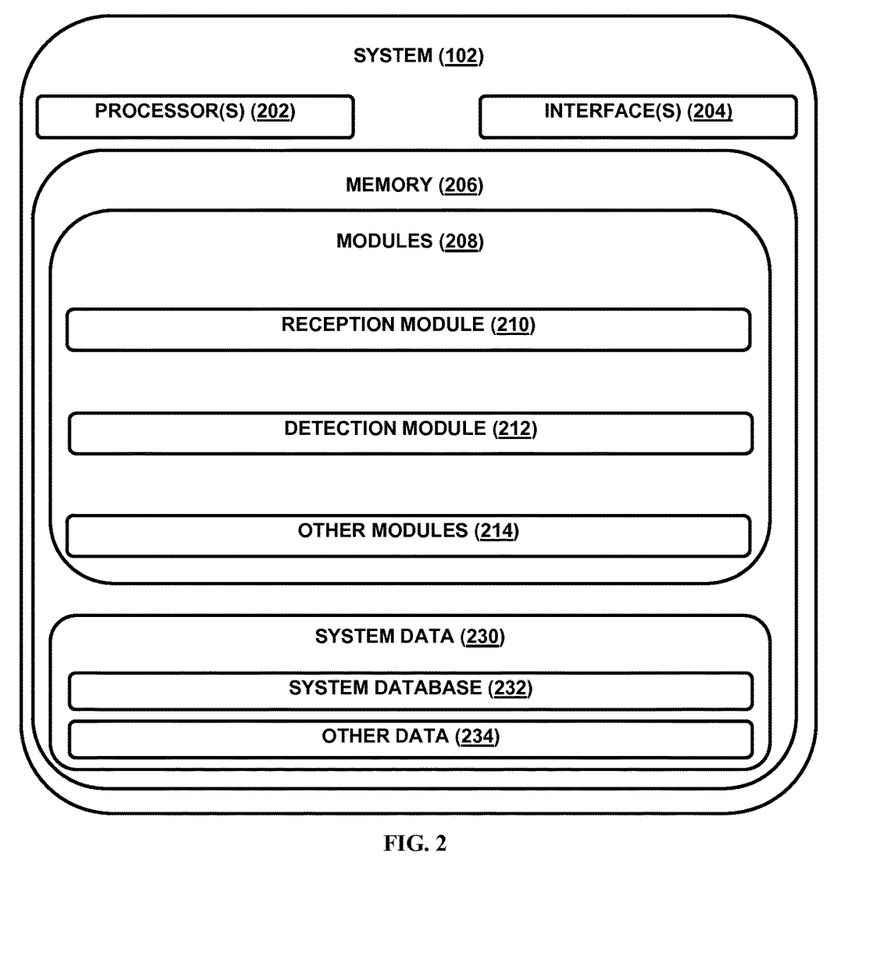
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and system data 230.

The modules 208 include routines, programs, objects, components, data structures, etc., which perform particular tasks or implement particular abstract data types. In one implementation, the modules 208 may include a reception module 210, a detection module 212, and other modules 214. The other modules 214 may include programs or coded instructions that supplement applications and functions of the system 102.

The system data 230, amongst other things, serves as a repository for storing data processed, received, and generated by one or more of the modules 208. The system data 230 may also include a system database 232 and other data 234. The other data 234 may include data generated as a result of the execution of one or more modules in the other modules 214.

In one implementation, at first, a user may use the client device 104 to access the system 102 via the I/O interface 204. The working of the system 102 may be explained in detail in FIG. 2 explained below. The system 102 may be used for detecting sensitivity content in time-series data. In order to detect the sensitivity content, the system 102, at first, receives the time-series data from a source. Specifically, in the present implementation, the time-series data is received by the reception module 210.

In one embodiment, referring to FIG. 2, the reception module 210 may be configured to receive the time-series data from the source. In one embodiment, the source may comprise sensors. The sensors may comprise devices that measure or sense at least one physical value and convert the at least one physical value sensed into one or more signals. For example, the at least one physical value may include but is not limited to temperature, voltage, humidity, electric current, location, motion, and pressure. The one or more signals sensed may be an analog signal or a digital signal. In one embodiment, the sensors may comprise sensors embedded to the system 102 in order to transmit the data. In one embodiment, the sensors may comprise one or more wireless sensors that transmit the time-series data to the system 102. The sensors may transmit the time-series data to the system 102 in real-time.

In another embodiment, the time-series data received from the source may comprise data from one or more sensors. In one embodiment, the one or more sensors may sense the data associated with a single device or multiple devices and transmit the data to the system 102. For example, the one or more sensors may sense the data such as the electric current, or voltage fluctuation, or power consumption, or a combination thereof and transmit the data to the system 102. In one exemplary embodiment, the one or more sensors may include but are not limited to a smart meter, a pressure sensor, a gas meter, a motion detector, a water meter, a Global Positioning System (GPS), and an electricity meter.

Further, the time-series data may be received for one or more instances. In one embodiment, an instance of the one or more instances may be associated with a value of the time-series data. The time-series data received for the one or more instances may comprise the value for the power consumption, or the voltage fluctuation, or the physical value such as temperature and humidity that represent occurrence of the value corresponding to the instance. The value may be associated with the instance i.e., with a particular time interval represented in a form of time stamps maintained for the time-series data. In other words, the time series data may be referred as a data stream comprising plurality of time stamps. The value is associated with each time stamp i.e., the instance of the one or more instances collected over a period of time.

In one embodiment, the time-series data may be received for the one or more instances in different cycles. In one exemplary embodiment, the value corresponding to the instance may be received for every minute for a time period of 24 hour. Further, the value corresponding to each of the instance may be received for every second for a time period of 1 hour. For example, the value corresponding to each instance may indicate measurement of the power consumption by the smart meter for the one or more instance in the time-series data.

Following embodiments are illustrated considering that the time-series data is received from the smart meter as the source. However, the present disclosure may be implemented on any other time-series data that may be received from any other source and such implementation is obvious to persons skilled in the art.

Figure 3:
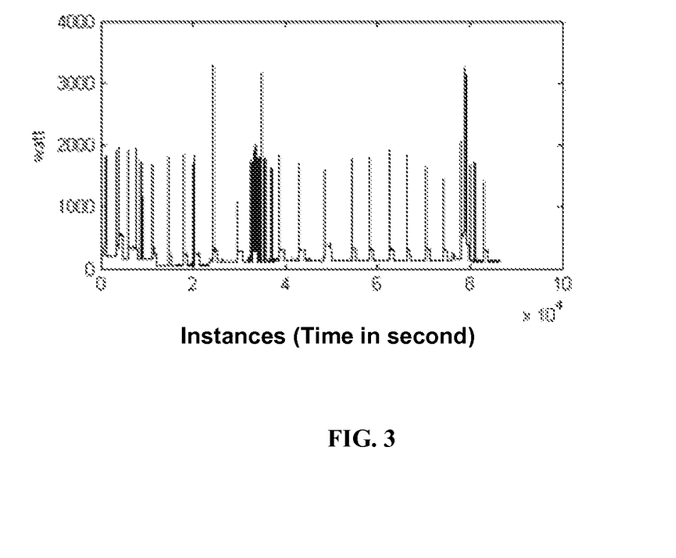
FIG. 3 illustrates the time-series data received form a source, in accordance with an embodiment of the present disclosure.

In one exemplary embodiment, the reception module 210 may receive the value from the smart meter at a time interval of every 1 second. The value corresponding to the energy consumption may be measured in Watt by the smart meter for the one or more instances. The value measured with a time-stamp of 1 second interval is illustrated in FIG. 3. The value corresponding to each instance is collected and the time-series data is aggregated for the one or more instances.

Figure 4:
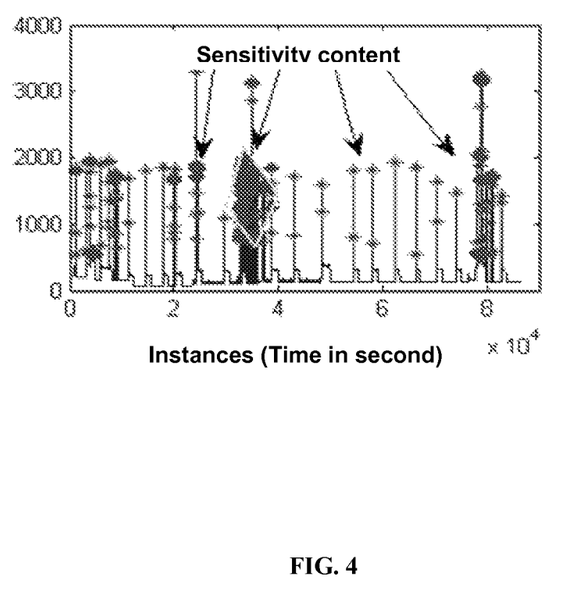
FIG. 4 illustrates sensitivity content detected in the time-series data, in accordance with an embodiment of the present disclosure.

The time-series data may be considered for a period of 24 hours receiving the value at the instance of 1 second interval. The value measured for each instance for the period of 24 hour at the instance of 1 second interval is illustrated in FIG. 4. In one embodiment, referring to FIG. 2, the detection module 212 may be configured to detect the sensitivity content in the time-series data. The sensitivity content indicates presence of an anomaly in the time-series data. Further, the sensitivity content may be defined as a minute statistical anomaly that may be indicative of existence of private information in the time-series data. In other words, the sensitivity content may be indicative of an outlier in the time-series data. In one exemplary embodiment, the sensitivity content detected for the value corresponding to each instance for the one or more instances in the time-series data is shown FIG. 4.

In order to detect the sensitivity content in the time-series data, a statistical analysis may be carried out on the time-series data. In one embodiment, the statistical analysis comprising a kurtosis statistical approach is implemented on the time-series data. The kurtosis statistical approach may be used to measure peakedness of a data distribution. In one exemplary embodiment, the data distribution may be plotted on the time-series data as shown in FIG. 4. In one embodiment, the detection module 212 may determine a kurtosis value corresponding to the data distribution. In one embodiment, the detection module 212 determines the kurtosis value for the value corresponding to each instance of the one or more instances in the time-series data.

In one embodiment, for detecting the sensitivity content in the time-series data, nature of the data distribution may be determined to analyze the value that deviates from the value corresponding to successive instances. The kurtosis may be defined as a standardized fourth population about a mean.

$$\beta_2 = \frac{E[(X-\mu)^4]}{(E[(X-\mu)^2])^2} = \frac{\mu_4}{\sigma^4}$$

Where E is an expectation operator, $\mu$ is the mean, $\mu_4$ is the fourth moment about the mean and $\sigma$ is a standard deviation. The kurtosis value $\kappa$ may be determined with respect to a normal distribution of the time-series data. In one embodiment, a reference value may be determined for the data distribution when the data distribution follows the normal distribution. The normal distribution for the kurtosis statistical approach comprises the value of 3. Further, when the data distribution peak follows the normal distribution; the data distribution is referred as a mesokurtic distribution.

The detection module 212 may be configured to compare the kurtosis value κ with the reference value, i.e., 3 to determine the data distribution. Further, the detection module 212 may determine the data distribution of the time-series data based upon the comparison. The data distribution comprises one of a platykurtic distribution, the mesokurtic distribution, and a leptokurtic distribution. In one embodiment, the detection module 212 may be further configured to process the time-series data using a first filtering means or a second filtering means in order to detect the sensitivity content.

In one embodiment, when the data distribution has a peak lower than the mesokurtic distribution, the data distribution is referred as the platykurtic distribution. In one embodiment, the first filtering means is used when the kurtosis value κ corresponding to the value associated with the instance is less than or equal to the reference value, i.e., 3. In other words, the first filtering means is used when the time-series data distribution follows the mesokurtic distribution or the platykurtic distribution.

The first filtering means may comprise a Hampel filter. The Hampel filter is used to minimize masking effect when detecting the sensitivity content in the data. Masking may occur at the time of specifying less number of the sensitivity content in the time-series data. For example, only one sensitivity content may be detected when there might be at least two sensitivity contents are present in the time-series data. The sensitivity content that is not detected may influence other sensitivity contents present in the time-series data. The sensitivity content may specify that the other sensitivity contents are not deviating from the value corresponding to successive instances of the one or more instances.

In order to detect the sensitivity content that masks a neighbouring sensitivity content, the detection module 212 processes the time-series data by calculating a median and a Median Absolute Deviation (MAD) for the value deviating from the value corresponding to successive instances of the one or more instances. In one embodiment, consider ε as the time-series data and the kurtosis value κ being less than or equal to the reference value, 3 and n is number of the instances comprising the value for each instance in the time-series data ε. At first, the median of the time-series data ε may be computed, where n=1, 2, . . . , N. The median of the time-series data $\varepsilon_N$ is calculated using an expression $$\text{median}(\varepsilon_N) = \frac{\varepsilon_{\lfloor (N+1)/2 \rfloor : N} + \varepsilon_{\lfloor N/2 \rfloor : N}}{2}$$

Further, the Median Absolute Deviation (MAD) may be calculated for the value. The MAD may be calculated using an expression:

$$\text{MAD}(\varepsilon_N) = \text{median}(|\varepsilon_1 - \text{median}(\varepsilon_N)|, \ldots, |\varepsilon_N - \text{median}(\varepsilon_N)|), \text{ where } |\varepsilon| = N.$$

Further, the observation for the value $\varepsilon_n$ may be detected as the sensitivity content when $|\varepsilon_N - \text{median}(\varepsilon_N)| > 3 \cdot \text{MAD}(\varepsilon_N)$ In order to minimize the masking effect, the sensitivity content detection resulting in larger masking breakdown point may be considered. The breakdown point may be defined as a smallest percentage of the sensitivity content or the outlier that may cause the detection of the sensitivity content to take an arbitrary high value. Therefore, higher the breakdown point for the detection of the sensitivity content, the detection of the sensitivity content becomes accurate. The Hampel filter is used to achieve a higher value for the breakdown point thereby minimizing the masking effect.

The masking effect in detecting the sensitivity content predominates when resultant distance between the mean and the sensitivity content is small. Further, when the kurtosis value κ is less than the reference value, the data distribution follows the platykurtic distribution and tends to be independent and identically distributed. Therefore, the masking effect may be high. In one exemplary embodiment, consider that the mean comprises a breakdown point of 1/n since the value for the observation is high and the value can make the mean and the variance cross any bound. Accordingly, by calculating the median and the MAD, the sensitivity content may be detected effectively.

In one embodiment, when the data distribution comprises the kurtosis value κ greater than the reference value, the data distribution is referred as the leptokurtic distribution. In one embodiment, the second filtering means is used when the kurtosis value κ corresponding to the value associated with the instance in the time-series is greater than the reference value, i.e. 3. In other words, the second filtering means is used when the data distribution follows the leptokurtic distribution.

In one embodiment, the second filtering means may comprise a median-based Rosner filter. The second filtering means may be used to detect the sensitivity content when the kurtosis value κ is greater than the reference value i.e., 3. In order to detect the sensitivity content, when the data distribution follows the leptokurtic distribution, the time-series data may fit to a student's-t distribution such that swamping effect is minimized.

The median-based Rosner filter is used as a backward selection method-based outward outlier testing. The median-based Rosner filter uses Extreme Studentized Distribution (ESD) test to detect the outlier in the time-series data. At first, a suspected number of outliers φ may be specified. The median-based Rosner filter uses only upper bound of the suspected number of outliers φ to provide an optimal solution. Further, when the suspected number of outliers φ is not known or is ambiguous, the median-based Rosner filter provides optimal swamping breakdown point.

For detecting the sensitivity content, instead of mean deviation, mediation deviation is selected. At first, the median-based Rosner filter performs q number of separate tests. Further, the median-based Rosner filter computes the mediation deviation $$Q_i = \frac{\max_i (\varepsilon_i - \text{median}(\varepsilon_N))}{\sigma},$$

where, i=1, 2, . . . , q, and $\varepsilon_i$ is the time-series data under observation. The observations that maximizes ($\varepsilon_i$-median ($\varepsilon_N$)) may be removed and the tests may be repeated. The repeated tests may result in the q test statistics Q1, Q2, . . . , Qq. The sensitivity content in the time-series data ε is the value that deviates from the assumed student's-t distribution, i.e., $Q_i > \eta_i$, where $$\eta_i = \frac{(N-i)t_{p,N-i-1}}{((N-i-1+t^2_{p,N-i-1})(N-i+1))^{1/2}},$$

$t_{p,v}$ is the 100p percentage point from the student's-t distribution with v degrees of freedom and $$p = 1 - \frac{\theta}{2(N-i+1)}.$$

With underlying data distribution, the time-series data ε is approximated to student's-t distribution and an error in detection of the sensitivity content is minimized while achieving optimal swamping effect.

In one embodiment, the detection module 212 may assign an appropriate value of detection criteria θ and number of separate tests q for detecting the sensitivity content in the time-series data. For example, the value corresponding to q may depend on temporary resolution and block size of the time-series data ε(t). In one embodiment, 1 Hz resolution with 24 hour block may be considered such that q may be assigned with a value 0.3*|ε|. Further, for low resolution and small block size, q may be selected with higher value, for example, 0.5*|ε| to improve accuracy. Further, the detection criteria θ may be dependent on the Y-axis indicating a data resolution and a range. For example, the value of θ may be set as 0.1 considering the resolution for the value indicating the energy consumption of 1 Watt with the range of 3 KWatt. Further, when the range or the resolution is lower, lower value of θ may be considered, for example, θ=0.08.

In one embodiment, the detection module 212 is configured to identify a density of the sensitivity content. The density indicates presence of the sensitivity content in at least two successive instances of the one or more instances. In one exemplary embodiment, the detection module 212 may alert the user indicating the density identification. The detection module 212 may alert the user when the at least two successive instances comprises the sensitivity content. Further, the detection module 212 may alert the user as defined by the user.

In one exemplary embodiment, the time-series data is processed to detect the sensitivity content using a Z-score and a modified Z-score statistical measurement to measure and compare the performance of the system 102. The Z-score is calculated by dividing the difference from the mean by the standard deviation. The modified Z-score is a standardized score that measures outlier strength. The modified Z-score is calculated from median absolute deviation (MAD). The values are be multiplied by a constant to approximate the standard deviation.

The system 102, the Z-score and the modified Z-score is implemented using theoretical statistical parameters for measuring performance such as detection of the sensitivity content by minimizing masking and/or swamping effect. The theoretical statistical parameters considered for measuring performance may include but is not limited to a KL divergence (KL) test, a Kolmogorov complexity (KC) test from information theory, a Mahalanobis distance (MD) and a Bhattacharyya distance (BD) test.

Referring to FIG. 5A-5D, illustrate measuring and comparing performance of the system 102 with the Z-score and modified Z-score statistical measurement. In the FIG. 5A-5D, bar A in bar-graphs shown indicates the performance of the system 102, bar B in the bar-graphs indicate the performance of the Z-score and the bar C in bar-graphs indicate the performance of the modified Z-score.

Figure 5A:
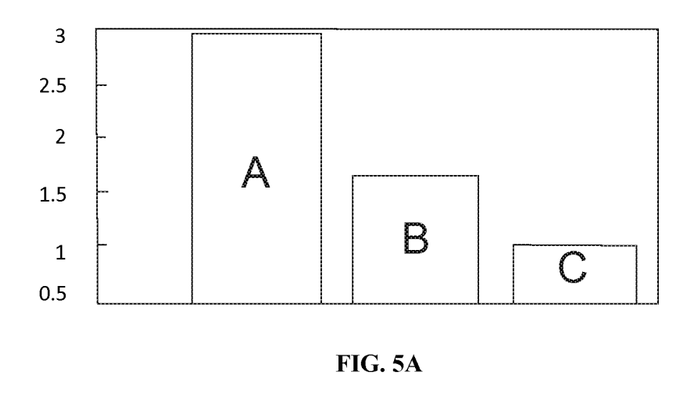
FIG. 5A-5D illustrates measuring and comparing performance of the system, in accordance with an embodiment of the present disclosure.

FIG. 5A illustrates the performance of the system 102, the Z-score and the modified Z-score based on the KL divergence test. Based on Sanov's theorem of large deviation, for the KL divergence test, more the KL divergence indicates more probability for detection of the sensitivity content. For the time-series data as illustrated in FIG. 4, the system 102 detects the sensitivity content efficiently when compared to the Z-score and the modified Z-score.

Figure 5B:
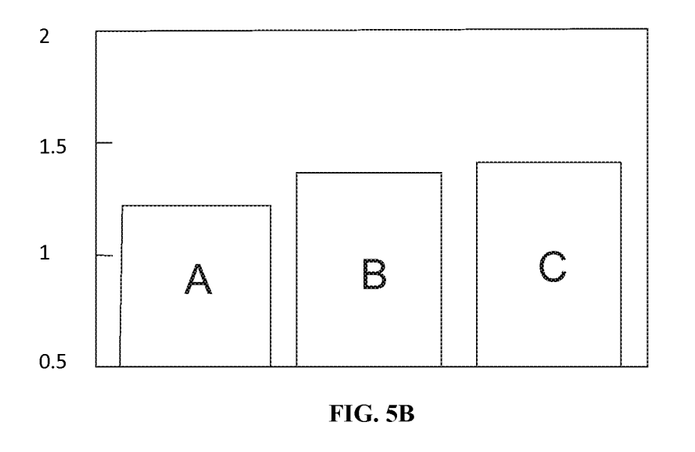

FIG. 5B illustrates the performance of the system 102, the Z-score and the modified Z-score based on the Conditional Kolmogorov complexity test. For the Conditional Kolmogorov complexity test, lesser the Conditional Kolmogorov complexity more is transfer of the value from the time-series data ε to sensitivity content detected S. For the time-series data as illustrated in FIG. 4, the system 102 detects the sensitivity content efficiently when compared to the Z-score and the modified Z-score.

Figure 5C:
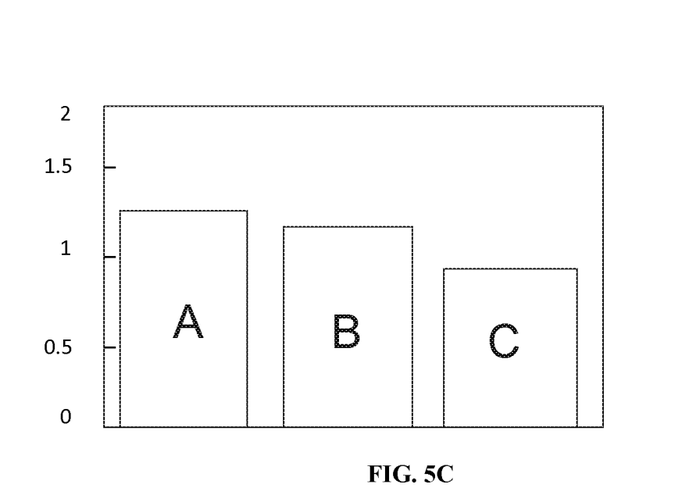

FIG. 5C illustrates the performance of the system 102, the Z-score and the modified Z-score based on the Bhattacharyya distance test. For the Bhattacharyya distance test, asymptotic efficiency for optimal error exponent of the $$\text{sensitivity content} \propto \frac{1}{\text{absolute Bhattacharyya distance}}$$

is measured. For Bhattacharyya distance test, more the absolute Bhattacharyya distance, less is the error exponent. For the time-series data as illustrated in FIG. 4, the system 102 detects the sensitivity content efficiently when compared to the Z-score and the modified Z-score.

Figure 5D:
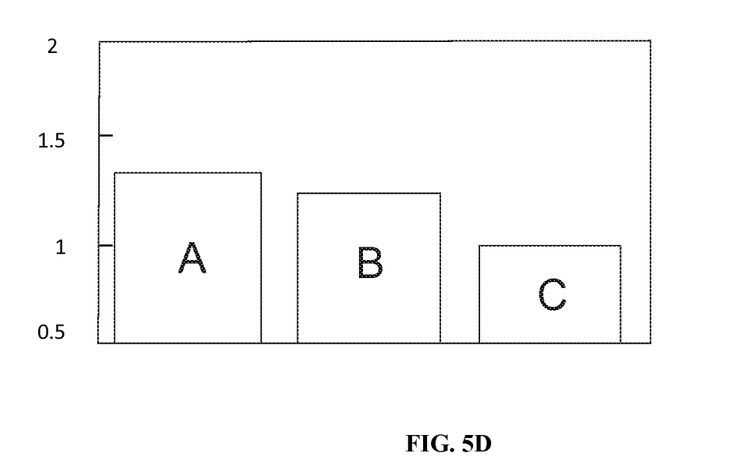

FIG. 5D illustrates the performance of the system 102, the Z-score and the modified Z-score based on the Mahalanobis distance test. For the Mahalanobis distance test, larger the value of Mahalanobis distance, higher the indication for detection of the sensitivity content. For the time-series data as illustrated in FIG. 4, the system 102 detects the sensitivity content efficiently when compared to the Z-score and the modified Z-score.

Figure 6:
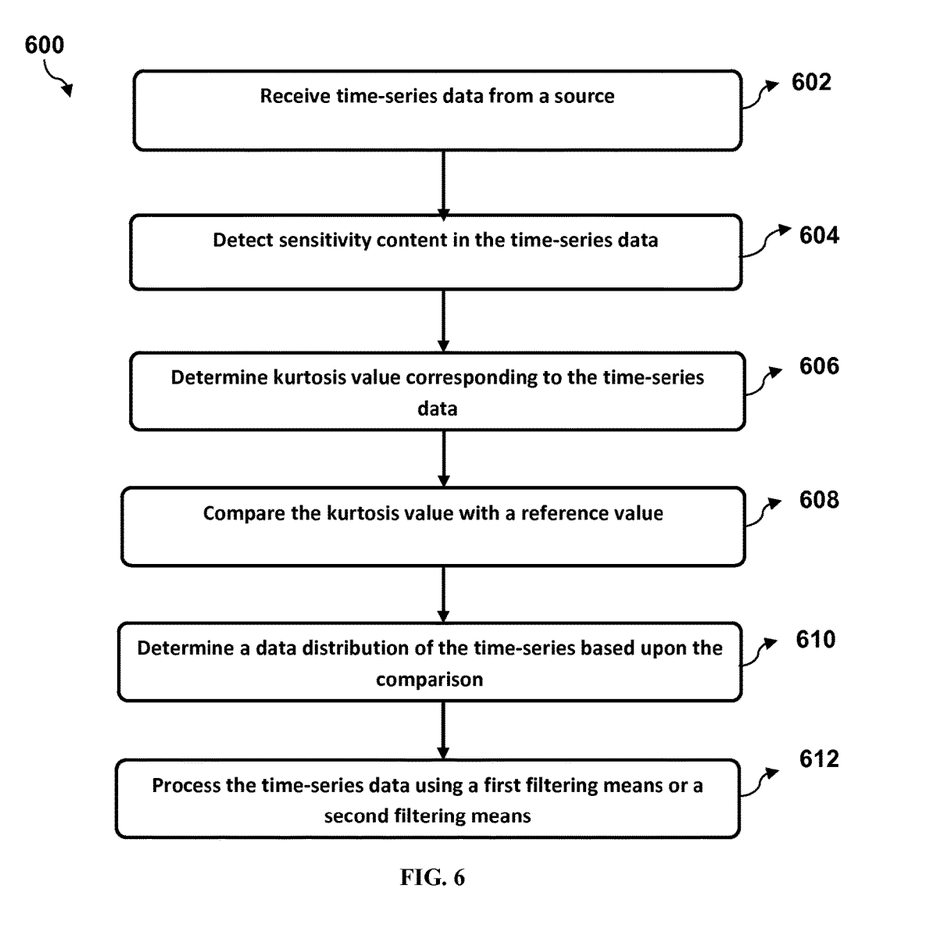
FIG. 6 illustrates a method for detecting sensitivity content in time-series data, in accordance with an embodiment of the present disclosure.

Referring now to FIG. 6, a method 600 for detecting sensitivity content in time-series data is shown, in accordance with an embodiment of the present disclosure. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described and is not intended to be construed as a limitation, and any number of the described method blocks can be combined in any order to implement the method 600 or alternate methods. Additionally, individual blocks may be deleted from the method 600 without departing from the spirit and scope of the disclosure described herein. Furthermore, the method may be implemented in any suitable hardware, software, firmware, or combination thereof. However, for ease of explanation, in the embodiments described below, the method 600 may be implemented in the above-described system 102.

At step 602, the time-series data may be received from a source. In one implementation, the time-series data may be received by the reception module 210. The time-series data may be received for one or more instances. An instance of the one or more instances may be associated with a value of the time-series data.

At step 604, the sensitivity content in the time-series data may be detected. The sensitivity content indicates presence of an anomaly in the time-series data. In one implementation, the sensitivity content may be detected by the detection module 212.

At step 606, a kurtosis value may be determined corresponding to the time-series data. In one implementation, the kurtosis value may be determined by the detection module 212.

At step 608, the kurtosis value may be compared with a reference value. In one implementation, the kurtosis value may be compared with the reference value by the detection module 212.

At step 610, a data distribution of the time-series data is determined based upon the comparison. The data distribution comprises one of a platykurtic distribution, a mesokurtic distribution, and a leptokurtic distribution. In one implementation, the data distribution of the time-series data is determined by the detection module 212.

At step 612, the time-series data may be processed using a first filtering means or a second filtering means. The first filtering means is used when the data distribution of the time-series data is either of the platykurtic distribution or the mesokurtic distribution. The second filtering means is used when the data distribution of the time-series data is the leptokurtic distribution. In one implementation, the time-series data may be processed by the detection module 212.

Although implementations of system and method for detecting sensitivity content in time-series data from the smart meter or the sensors have been described in language specific to structural features and/or methods, it is to be understood that the appended claims are not necessarily limited to the specific features or methods described. Rather, the specific features and methods are disclosed as examples of implementations for detecting sensitivity content in time-series data.

We claim:

1. A method for detecting sensitivity content in time-series data, the method comprising:

receiving, by a processor in a server, the time-series data from a source in real-time, wherein the time-series data is received for one or more instances, and wherein an instance of the one or more instances is associated with a value of the time-series data, and wherein the source comprises one or more sensors, wherein the one or more sensors measure the value of the time-series data and convert the value into one or more signals, wherein the one or more sensors include one or more wireless sensors to transmit the time-series data to the server in real-time;

detecting, by the processor, the sensitivity content in the time-series data, wherein the sensitivity content indicates presence of an anomaly and the sensitivity content is defined as a minute statistical anomaly indicative of existence of private information in the time-series data, wherein the sensitivity content is detected for a value corresponding to each instance from the one or more instances in the time-series data, wherein the detecting comprises:

determining a kurtosis value corresponding to each instance of the one or more instances associated with the value of the time-series data in a data distribution of the time-series data, wherein the value of the time-series data includes a plurality of time stamps associated with the one or more instances;

comparing the kurtosis value with a reference value;

determining a data distribution of the time-series data based upon the comparison, wherein the data distribution is one of a platykurtic distribution when the kurtosis value is less than the reference value, a mesokurtic distribution when the kurtosis value is equal to the reference value, and a leptokurtic distribution when the kurtosis value is greater than the reference value;

processing the time-series data using a Hampel filter and a median-based Rosner filter, wherein the Hampel filter is used when the data distribution of the time-series data is either of the platykurtic distribution or the mesokurtic distribution, and wherein the median-based Rosner filter is used when the data distribution of the time-series data is the leptokurtic distribution, wherein the Hampel filter is used to minimize masking effect when detecting the sensitivity content by choosing a higher value for a breakdown point, and wherein the median-based Rosner filter is used, when a number of outliers is unknown, to provide optimal swamping breakdown point;

identifying, by the processor, a density of the detected sensitivity content, wherein the density of the detected sensitivity content indicates presence of the anomaly in at least two successive instances of the one or more instances, wherein the Hampel filter and the median-based Rosner filter minimizes false positive and false negative alarm rates while detecting the sensitivity content in the time-series data.

2. The method of claim 1, further comprising alerting a user indicating the density identification when the at least two successive instances comprise the sensitivity content.

3. The method of claim 1, wherein the time-series data is processed using the Hampel filter by calculating a median and a median absolute deviation of the time-series data in order to reduce masking effect, wherein the higher breakdown point improves the accuracy of detecting the sensitivity content.

4. The method of claim 1, wherein the time-series data is processed using the median-based Rosner filter by approximating the time-series data to a student-t distribution and minimizing an error in detection of the sensitivity content while achieving optimal swamping effect.

5. A system for detecting sensitivity content in time-series data, the system implemented on a server comprising:

a processor;

a memory coupled to the processor, wherein the processor executes a plurality of modules stored in the memory, and wherein the plurality of modules comprising:

a reception module to receive the time-series data from a source, wherein the data is received for one or more instances, and wherein an instance of the one or more instances is associated with a value of the time-series data, and wherein the source comprises one or more sensors, wherein the one or more sensors measure the value of the time-series data and convert the value into one or more signals, wherein the one or more sensors include one or more wireless sensors to transmit the time-series data to the server in real-time;

a detection module to detect the sensitivity content in the time-series data, wherein the sensitivity content indicates presence of an anomaly and the sensitivity content is defined as a minute statistical anomaly indicative of existence of private information in the time-series data, wherein the sensitivity content is detected for a value corresponding to each instance from the one or more instances in the time-series data, wherein the detection further comprising:

determining a kurtosis value corresponding to each instance of the one or more instances associated with the value of the time-series data in a data distribution of the time-series data, wherein the value of the time-series data includes a plurality of time stamps associated with the one or more instances;

comparing the kurtosis value with a reference value;

determining a data distribution of the time-series data based upon the comparison, wherein the data distribution is one of a platykurtic distribution when the kurtosis value is less than the reference value, a mesokurtic distribution when the kurtosis value is equal to the reference value, and a leptokurtic distribution when the kurtosis value is greater than the reference value; and processing the time-series data using a Hampel filter and a median-based Rosner filter, wherein the Hampel filter is used when the data distribution of the time-series data is either of the platykurtic distribution or the mesokurtic distribution, and wherein the median-based Rosner filter is used when the data distribution of the time-series data is the leptokurtic distribution, wherein the Hampel filter is used to minimize masking effect when detecting the sensitivity content by choosing a higher value for a breakdown point, and wherein the median-based Rosner filter is used, when a number of outliers is unknown, to provide optimal swamping breakdown point; and identifying a density of the detected sensitivity content, wherein the density of the detected sensitivity content indicates presence of the anomaly in at least two successive instances of the one or more instances, wherein the Hampel filter and the median-based Rosner filter minimizes false positive and false negative alarm rates while detecting the sensitivity content in the time-series data.

6. The system of claim 5, wherein the detection module further alerts a user indicating the density identification when the at least two successive instances comprise the sensitivity content.

7. The system of claim 5, wherein the detection module processes the time-series data using the Hampel filter by calculating a median and a median absolute deviation of the time-series data in order to reduce masking effect, wherein the higher breakdown point improves the accuracy of detecting the sensitivity content.

8. The system of claim 5, wherein detection module processes the time-series data using the median-based Rosner filter by approximating the time-series data to a student-t distribution and minimizing an error in detection of the sensitivity content while achieving optimal swamping effect.

9. A non-transitory computer readable medium embodying a program executable in a server for detecting sensitivity content in time-series data, the program comprising:

a program code for receiving the time-series data from a source, wherein the time-series data is received for one or more instances, and wherein an instance of the one or more instances is associated with a value of the time-series data, and wherein the source comprises one or more sensors, wherein the one or more sensors measure the value of the time-series data and convert the value into one or more signals, wherein the one or more sensors include one or more wireless sensors to transmit the time-series data to the server in real-time;

a program code for detecting the sensitivity content in the time-series data, wherein the sensitivity content indicates presence of an anomaly and the sensitivity content is defined as a minute statistical anomaly indicative of existence of private information in the time-series data, wherein the sensitivity content is detected for a value corresponding to each instance from the one or more instances in the time-series data, wherein the program code for detecting comprises:

a program code for determining a kurtosis value corresponding to each instance of the one or more instances associated with the value of the time-series data in a data distribution of the time-series data, wherein the value of the time-series data includes a plurality of time stamps associated with the one or more instances;

a program code for comparing the kurtosis value with a reference value;

a program code for determining a data distribution of the time-series data based upon the comparison, wherein the data distribution is one of a platykurtic distribution when the kurtosis value is less than the reference value, a mesokurtic distribution when the kurtosis value is equal to the reference value, and a leptokurtic distribution when the kurtosis value is greater than the reference value; and a program code for processing the time-series data using a Hampel filter and a median-based Rosner filter, wherein the Hampel filter is used when the data distribution of the time-series data is either of the platykurtic distribution or the mesokurtic distribution, and wherein the median-based Rosner filter is used when the data distribution of the time-series data is the leptokurtic distribution, wherein the Hampel filter is used to minimize masking effect when detecting the sensitivity content by choosing a higher value for a breakdown point, and wherein the median-based Rosner filter is used, when a number of outliers is unknown, to provide optimal swamping breakdown point; and a program code for identifying a density of the detected sensitivity content, wherein the density of the detected sensitivity content indicates presence of the anomaly in at least two successive instances of the one or more instances, wherein the Hampel filter and the median-based Rosner filter minimizes false positive and false negative alarm rates while detecting the sensitivity content in the time-series data.

* * * * *